(12) United States Patent
Joubert

(10) Patent No.: US 6,500,399 B1
(45) Date of Patent: Dec. 31, 2002

(54) METHOD FOR MAKING LITHIUM HEXAFLUOROPHOSPHATE

(75) Inventor: Philippe Joubert, Lyons (FR)

(73) Assignee: Atofina, Paris la Defense Cedex (FR)

( * ) Notice: Subject to any disclaimer, the term of this patent is extended or adjusted under 35 U.S.C. 154(b) by 0 days.

(21) Appl. No.: 09/763,188

(22) PCT Filed: Jun. 25, 1999

(86) PCT No.: PCT/FR99/01531

§ 371 (c)(1),
(2), (4) Date: Mar. 23, 2001

(87) PCT Pub. No.: WO00/10917

PCT Pub. Date: Mar. 2, 2000

(30) Foreign Application Priority Data

Aug. 21, 1998 (FR) ............................................ 98 10634

(51) Int. Cl.$^7$ ............................................... C01B 25/10
(52) U.S. Cl. ....................................................... 423/301
(58) Field of Search ......................................... 423/301

(56) References Cited

U.S. PATENT DOCUMENTS

| 2,488,299 A | * | 11/1949 | Lange et al. ................. 423/301 |
| 4,482,616 A | * | 11/1984 | Connolly et al. ........... 429/201 |
| 5,378,445 A | * | 1/1995 | Salmon et al. ............... 423/301 |
| 5,866,093 A | * | 2/1999 | Belt et al. .................... 423/301 |
| 6,387,340 B1 | * | 5/2002 | Na et al. ...................... 423/301 |

FOREIGN PATENT DOCUMENTS

| CA | 2 193 119 | | 6/1997 |
| JP | 175216 | * | 6/1992 |

OTHER PUBLICATIONS

Patent Abstracts of Japan vol. 16, No. 479 (C–0992) Oct. 6, 1992 & JP04 175216 (Jun. 23, 1992)Tookemu Purodakutsu:KK.
Patent Abstracts of Japan vol. 18, No. 061 (C–1160) Feb. 2, 1994 & JP 05 279003 (Oct. 26, 1993) Morita Kagaku Kogyo KK.
Patent Abstracts of Japan vol. 95, No. 001 Feb. 28, 1995 & JP06 298506 (Oct. 25, 1994) Central Glass Co. Ltd.

* cited by examiner

*Primary Examiner*—Wayne A. Langel
(74) *Attorney, Agent, or Firm*—Millen, White, Zelano & Branigan, P.C.

(57) ABSTRACT

The process consists in manufacturing LiPF$_6$ by reacting LiF with PF$_5$ in liquid sulphur dioxide (SO$_2$).

The LiPF$_6$, obtained in a yield of 99.5% relative to the LiF reacted, has a purity of greater than or equal to 99.90% according to the assays carried out.

7 Claims, No Drawings

METHOD FOR MAKING LITHIUM HEXAFLUOROPHOSPHATE

The present invention relates to a process for manufacturing lithium hexafluorophosphate ($LiPF_6$).

Lithium hexafluorophosphate is used mainly as an electrolyte in rechargeable batteries.

In this application, the current specifications regarding the weight contents of the main impurities are as follows:

hydrogen fluoride (HF)<200 ppm lithium fluoride (LiF)<1000 ppm.

The contents of phosphorus oxyfluorides ($O=PF_3$, $O=PF_2OH$) are not explicitly indicated, but it is considered that their sum should be less than 1000 ppm.

In the rechargeable batteries industry, it has been noted that traces of acid impurities (labile protons $H^+$) are harmful to the electrochemical behaviour of the battery, in particular to the formation of the passivation layer at the interface of the lithium electrode/electrolyte or $Li_xC_6$/electrolyte, which has the consequence of adversely affecting the capacitance of the battery and its lifetime (number of charging and discharging cycles).

The problem arises of industrially obtaining $LiPF_6$ with a very low content of acid impurities in order to obtain a high-quality electrolyte.

Virtually all of the known processes for synthesizing $LiPF_6$ involve a step in which the crystalline $LiPF_6$ is either dissolved or placed in contact with a large excess of liquid HF. The strategy then consists in obtaining, by crystallization, large (1 to 3 mm) $LiPF_6$ crystals tending towards being as perfect as possible (quasi-monocrystals) in order to minimize the amounts of HF which are dissolved and/or occluded therein.

Thus, in Japanese patent application 60-251 109, $PCl_5$ is added to a solution of LiF in liquid anhydrous HF in order to obtain $LiPF_6$ in solution, and the HF is then evaporated off slowly. The product obtained is in the form of crystals 1 to 3 mm in size, accompanied by a white powder containing LiF. Example 1 indicates the production of 40 g of $LiPF_6$ in a yield of 65.1% and a purity of at least 99%. However, the methods for the analytical determination of this purity are not indicated.

Japanese patent application 4-175 216 teaches the production of gaseous $PF_5$ by reacting $PCl_5$ with anhydrous HF in large excess at −30° C. to give firstly white crystals of $HPF_6$ in HF, and the concomitant evaporation of the hydrogen chloride (HCl) produced in the reaction. The temperature is then raised to −10° C. to give gaseous $PF_5$ according to the reaction:

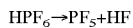

$HPF_6 \rightarrow PF_5 + HF$

The gaseous $PF_5$ thus obtained is introduced continuously into a solution of LiF.HF in HF in order to obtain $LiPF_6$ crystals with a uniform diameter of 2 to 3 mm. These crystals are separated from the filtrate by an ordinary technique which is not specified. The yield is 70% and the purity indicated is 99.98%. The analytical methods indicated for the lithium and phosphorus are, respectively, atomic absorption spectrometry and absorptiometry. On the other hand, the HF assay method is not indicated.

Japanese patent application 5-279 003 discloses a process for synthesizing $LiPF_6$ which can be used as an electrolyte in rechargeable batteries and which contains no phosphorus oxyfluoride ($O=PF_3$). $PCl_5$ is reacted with HF to give a gaseous mixture of $PF_5$ and HCl. This mixture is cooled to between −40° C. and −84° C. in order to remove the $O=PF_3$ by separation, and is then introduced into a solution of LiF in HF to form $LiPF_6$. The HF is distilled off under nitrogen in order to concentrate the solution, and this solution is then cooled to between 0° C. and −20° C. to give $LiPF_6$ crystals. These crystals are separated out by filtration and then flushed with nitrogen at between 40° C. and 80° C. to remove the residual HF. Examples 1, 2 and 3 indicate respective yields of 65.6%, 62.3% and 64.9% crystalline $LiPF_6$ having respective residual contents of acid compounds, assayed by titrimetry in aqueous medium, of 11, 12 and 12 ppm of $H^+$, which corresponds for a person skilled in the art to 220, 240 and 240 ppm of HF.

Japanese patent application 6-56413 discloses a process comprising the following steps:

A $PF_5 + 5HCl$ gaseous mixture is generated by reacting solid $PCl_5$ with HF gas at between 60 and 165° C. The gaseous mixture thus obtained is introduced into a reactor-crystallizing vessel containing LiF dissolved in liquid HF. The crystals obtained are dissolved by raising the temperature to ambient temperature and the solution obtained is then crystallized by lowering the temperature to −20° C. to give crystals with a particle size of 1 to 3 mm. The crystals are collected and then dried under reduced pressure. Example 1 indicates a yield of 35% for a purity of at least 99%. The mother liquors from Example 1 which still contain 113 g of $LiPF_6$ are recycled in Example 2 with a fresh amount of LiF to give $LiPF_6$ in a yield of 95% calculated relative to the fresh amount of LiF and an indicated purity of at least 99%. The analysis methods for establishing the purity are not mentioned.

Japanese patent application 6-298 506 discloses a process for recrystallizing $LiPF_6$ in HF, comprising a final step of drying under vacuum or under a stream of dry nitrogen at between 60° C. and 130° C. The residual content of acid impurities indicated in Examples 1, 2 and 3 is, respectively, 150, 100 and 60 ppm, which is interpreted by a person skilled in the art as being an HF content. The method for determining these contents is not indicated.

Japanese patent application 9-268 005 discloses a process for crystallizing $LiPF_6$ in HF, comprising a final step. of drying. Examples 1 and 3 indicate respective contents of free acid of 100 and 99 ppm for yields which are not indicated. To a person skilled in the art, the free acid is HF. The contents of insoluble residues in these same examples are, respectively, 0.08% and 0.07% by weight. In addition, the method for determining these contents is not dscribed.

In summary, since the above prior art does not describe the methods for analysing the residual contents of HF and of phosphorus oxyfluorides, it does not allow a person skilled in the art to check by experimentation the values indicated.

Moreover, patent application WO 98/06666 discloses a process in which LiF is reacted with $PCl_5$ or $POCl_3$ at a reaction temperature of from −20° C. to 300° C. for 0.1 to 10 h to give $LiPF_6$ according to:
a) $PCl_5 + 6LiF \rightarrow 5LiCl + LiPF_6$
b) $4POCl_3 + 18LiF \rightarrow 12LiCl + Li_3PO_4 + 3LiPF_6$
and $LiPF_6$ is isolated in solution form from the mixture: ethers, nitriles, esters, sulphones, carbonates, halogenated hydrocarbons and/or tertiary amines are used as solvent.

The purity obtained (Example 1) is only 99.8%, since 0.2% chloride remains in the $LiPF_6$. Furthermore, the analysis methods are not described.

The aim of the present invention is to provide a process for manufacturing $LiPF_6$ with a residual content of HF of less than 20 ppm (lower limit of detection for the analytical method) by reacting LiF and $PF_5$, in a yield, relative to the LiF reacted, of greater than 99%.

The process proposed must also be industrial to allow the manufacture of large amounts of LiPF$_6$ with an HF content of less than 20 ppm.

These objectives are achieved by the process for manufacturing LiPF$_6$ according to the invention, by reacting LiF with PF$_5$ in a liquid, characterized in that this liquid is sulphur dioxide (SO$_2$).

Liquid SO$_2$ replaces liquid HF as reaction medium and thus makes it possible to avoid all the technical problems associated with the removal of HF from the solid LiPF$_6$.

The liquid containing the LiF and PF$_5$ is advantageously at a temperature below 40° C.

This temperature preferably ranges from −10° C. to +10° C.

The PF$_5$/LiF molar ratio is advantageously greater than or equal to 1.05. This excess of PF$_5$ avoids the reverse reaction of decomposition of the LiPF$_6$ into PF$_5$ and LiF.

Advantageously, the PF$_5$ which reacts with LiF in the liquid SO$_2$ is derived from a gaseous mixture containing hydrogen chloride (HCl). Specifically, HCl behaves as an inert compound, without causing a reduction in the purity of the LiPF$_6$ obtained.

Preferably, from an industrial point of view, the HCl is present in the reaction in an HCl/PF$_5$ molar ratio substantially equal to 5. Specifically, the PF$_5$ used in the industrial synthesis of LiPF$_6$ is often produced by reacting PCl$_5$ with anhydrous HF, leading to a PF$_5$+5HCl gaseous mixture.

The process of the present invention also makes it possible to greatly minimize the other common impurities of LiPF$_6$, in particular phosphorus oxyfluoride compounds, especially O=PF$_3$ and O=PF$_2$OH.

Thus, the present invention makes it possible to obtain solid LiPF$_6$ in a relative weight purity of greater than or equal to 99.90%.

The solid LiPF$_6$ has a residual HF content of less than 20 ppm (detection limit of the analytical method used).

The solid LiPF$_6$ also has a content of 1,2-dimethoxyethane-insoluble residue of less than 100 ppm (detection limit of the analytical method used).

The present invention will be understood more clearly with the aid of the experimental section which follows.

Experimental Section

1/Analytical Methods a) Assay of the traces of HF, O=PF$_3$ and O=PF$_2$OH.

These assays are carried out by $^{19}$F NMR.

The sample of solid to be analysed is transferred into a dry glove box (the ambient H$_2$O content is less than 10 ppm by volume).

A known amount of LiPF$_6$ powder is taken and deuterated acetonitrile (CD$_3$CN, 0.5 ml) predried over 3 Å molecular sieves is added. The powder dissolves, forming a solution. This solution is introduced into a screw-topped NMR tube and the $^{19}$F spectrum is then recorded.

The doublet centred at 6 ppm corresponds to the PF$_6^-$ species with a coupling constant $^1$J P—F of 707 Hz. The doublet centred at −104 ppm corresponds to the HF species with a coupling constant $^1$J H—F of 480 Hz. Two other signals are occasionally detected and correspond to the two products of hydrolysis of LiPF$_6$, namely O=PF$_2$OH and O=PF$_3$, whose doublets are respectively centred at 6.4 ppm ($^1$J P—F=932 Hz) and at 10.6 ppm ($^1$J P—F=1064 Hz).

The relative HF content with respect to PF$_6^-$, O=PF$_2$OH and O=PF$_3$ comes down to measuring the surface areas of the lines corresponding to HF, LiPF$_6$, O=PF$_2$OH and O=PF$_3$. The process is performed in the same way for O=PF$_2$OH and O=PF$_3$.

The calculations are as follows:

relative molar % of HF =

$$\frac{(S \text{ signal at } -104 \text{ ppm})}{[(S \text{ signal at } 6.0 \text{ ppm})/6 + (S \text{ signal at } -104 \text{ ppm}) + (S \text{ signal at } 6.4 \text{ ppm})/2 + (S \text{ signal at } 10.6 \text{ ppm})/3]}$$

relative molar % of O =

$$PF_2OH = \frac{(S \text{ signal at } 6.4 \text{ ppm})}{[(S \text{ signal at } 6.0 \text{ ppm})/6 + (S \text{ signal at } -104 \text{ ppm}) + (S \text{ signal at } 6.4 \text{ ppm})/2 + (S \text{ signal at } 10.6 \text{ ppm})/3]}$$

relative molar % of O =

$$PF_3 = \frac{(S \text{ signal at } 10.6 \text{ ppm})}{[(S \text{ signal at } 6.0 \text{ ppm})/6 + (S \text{ signal at } -104 \text{ ppm}) + (S \text{ signal at } 6.4 \text{ ppm})/2 + (S \text{ signal at } 10.6 \text{ ppm})/3]}$$

(S: denoting the surface area of the line corresponding to each of the species).

Under the following analysis conditions, the HF detection limit is 150 mol.ppm relative to the total sum of the fluoro species present in the solution analysed. This limit value expressed in ppm by mass is substantially 20.

$^{19}$F NMR analysis conditions:

DRX400 Avance Bruker spectrometer

1H/13C/19F 3-channel probe observation frequency 376.45 MHz spectral width examined 80 000 Hz pulse angle 90° acquisition time 3.3 s reference for the chemical shifts (δ=0): trifluoroacetic acid (CF$_3$COOH) as external reference.

Sign convention: − to the right and + to the left.

The quantitativity conditions were obtained by measuring the longitudinal relaxation time T1 of the PF$_6^-$ and HF species (reverse-recovery method). The experimental conditions were adapted to take account of a relaxation time of greater than 5 times T1.

b) Gravimetric assay of the insoluble residues in LiPF$_6$.

All the containers used are made of perfluoroalkoxyalkane (PFA). They are washed beforehand with deionized water and then dried for 2 hours at 105° C. After drying, they are introduced into a glove box whose controlled atmosphere has a water content of less than 10 ppm by volume. The filter membrane is made of polytetrafluoroethylene (PTFE) and has a mesh size of 0.45 μm. This membrane is washed, dried, weighed (weight a) and then introduced into the glove box. All the following operations are carried out 24 hours after introducing the various containers and the filter membrane into the glove box.

An accurately weighed sample of about 20 g of LiPF$_6$, of weight m, is introduced into a beaker. 300 ml of 1,2-dimethoxyethane (DME) predried over 3 Å molecular sieves are then added thereto. After dissolving the LiPF$_6$, a solution is obtained, which is filtered through the PTFE membrane. This filtered solution is rinsed with 100 ml of DME. After rinsing the membrane, it is dried at 100° C. for 1 hour. After cooling, the membrane is again weighed (weight b).

The content of insoluble material is calculated in the following way:

$$E(\% \text{ by weight}) = 100 \times (b-a)/m$$

The absolute uncertainty on each weight gain measurement is 1 mg, which leads to a relative uncertainty of 100 ppm relative to the $LiPF_6$ sample.

c) Assay of the total sulphur in $LiPF_6$

The solid to be analysed is transferred into a dry glove box whose atmosphere has a water content of less than 10 ppm by volume.

An accurately weighed sample of about 5 g of $LiPF_6$ is then introduced into an approximately 50 cm³ flask fitted with a stopper. The flask containing the sample is removed from the glove box. About 20 cm³ of deionized water are introduced into the flask to dissolve the sample, followed by addition of 5 cm³ of aqueous 35% hydrogen peroxide solution and stirring is carried out to effect mixing. The resulting aqueous solution is then transferred into a 250 cm³ graduated conical flask. The waters from three successive rinses of the flask are introduced into the conical flask and are then made up to 250 cm³ with deionized water. The contents of the conical flask are analysed by ICP/AES (Inductively Coupled Plasma/Atomic Emission Spectroscopy). The lower limit of detection for a sulphur-containing compound, expressed as elemental sulphur (S), is 10 ppm.

Among the products used below in the examples:

The LiF used below as reference sample is obtained from the company Aldrich under the commercial reference 20,364-5 and has a purity of 99.99% by weight.

The $PF_5$ is obtained from the company Ozark-Mahoning (batch DF-17-85) and has a purity of greater than or equal to 99%.

The $SO_2$ is obtained from the company L'Air Liquide and has a purity of 99.9% by weight.

The commercial sample of $LiPF_6$, analysed below for comparative purposes, is obtained from the company Aldrich under the reference 45,022-7 (1996–1997 catalogue).

EXAMPLE 1

26.4g of LiF predried under dry nitrogen are introduced into a metal reactor made of 316 L grade stainless steel, equipped with four valves and provided with a magnetic bar, in a dry glove box ($H_2O<10$ ppm by volume). After closing the reactor in the glove box, it is connected via two of its valves, firstly to a source of liquid $SO_2$, and secondly to a source of $PF_5$, via separate tubing. This tubing is passivated before-hand with $PF_5$ and then degassed under a reduced pressure of less than 1 mmHg, for one hour. 516 g of $SO_2$ are then transferred in and the $SO_2$+LiF reaction medium is stirred with a magnetic stirrer. The reaction medium in the reactor is cooled to 3° C. The pressure inside the reactor is 0.08 MPa. $PF_5$ gas is then gradually added at a rate of 150 g/hour for 0.5 h, the pressure in the reactor not exceeding 0.25 MPa. Next, the pressure is raised to 1 MPa by adding $PF_5$ gas. The total amount of $PF_5$ introduced is 145 g. Stirring is then continued for 5 h, while keeping the temperature at 4° C., after which the mixture is allowed to warm to the ambient temperature of 20° C., with continued stirring.

The third valve is opened to allow the excess $PF_5$ and $SO_2$ to escape in gaseous form. Preferably, during this degassing step, the temperature of the reaction medium is less than 30° C. The gaseous effluent is trapped in a scrubber system. This gaseous effluent can also be recovered by condensation for further use.

The reactor is then opened, in the glove box, and 154 g of $LiPF_6$ are obtained (yield=99.5% relative to the LiF reacted).

The analyses performed according to the methods described above give the following results:

| | |
|---|---|
| $LiPF_6$ purity by mass | $\geq$99.90% |
| O = $PF_2OH$ | 100 ppm by mass |
| O = $PF_3$ | 70 ppm by mass |
| HF | not detected by NMR and thus less than 20 ppm by mass. |

Sulphur-containing compound, expressed as elemental sulphur (S): 350 ppm. Starting from the hypothesis that the sulphur-containing compound is residual $SO_2$, the content expressed as $SO_2$ is 700 ppm.

Insoluble residue: not detected since it is less than 100 ppm by mass.

Comparative example: assay of commercial $LiPF_6$ (Aldrich ref.: 45,022-7 Chimie fine Réactifs de Laboratoire [Laboratory Fine Chemistry Reagents] 1996–1997).

This product has an indicated purity of 99.99+%.

The analysis methods above give the following results:

| | |
|---|---|
| $LiPF_6$ relative purity | 99.81% |
| $POF_2OH$ | 1000 ppm |
| O = $PF_3$ | 50 ppm |
| HF | 900 ppm |

These results show that the value of the relative purity determined by NMR is less than that indicated for this commercial sample.

EXAMPLE 2

25.2 parts by weight of LiF predried under dry nitrogen are introduced into a metal reactor made of 316 L stainless steel, equipped with four valves and provided with a magnetic stirrer, in a dry glove box ($H_2O<10$ ppm by volume). After closing the reactor in the glove box, it is connected via two of its valves, firstly to a source of liquid $SO_2$, and secondly to a source of a $PF_5$+5HCl gaseous mixture. These tubes are passivated beforehand with the mixture ($PF_5$+5HCl) and then degassed under reduced pressure at 1 mmHg, for 30 minutes. 576 parts by weight of $SO_2$ are then transferred in and the LiF+$SO_2$ reaction medium is stirred by switching on the magnetic stirrer, setting the stirring speed at 750 rpm. The reaction medium in the reactor is cooled to 10° C. The pressure inside the reactor is 0.14 MPa. The gaseous mixture ($PF_5$+5HCl) is then added gradually at a rate of 1330 parts by weight/hour for 27 minutes, the pressure in the reactor not exceeding 0.9 MPa. The total amount of mixture introduced is 600 parts by weight. Stirring is continued for 8 hours, the temperature rising slowly towards the ambient temperature of 20° C.

The third valve is then gradually opened in order to allow the gaseous mixture ($SO_2$+$PF_5$ in excess+HCl) to escape in gaseous form. Preferably, during this degassing period, the temperature is below 25° C. A portion of the gaseous effluent is recycled into another $LiPF_6$ synthesis operation, and the remaining portion is trapped in a scrubber system.

The reactor is then opened in the glove box and 147.2 parts by weight of $LiPF_6$ are obtained (yield=99.6% relative to the LiF used at the start).

The analyses performed as described above give the following results:

| | |
|---|---|
| LiPF$_6$ purity by mass | 99.90% |
| O = PF$_2$OH | 120 ppm by mass |
| O = PF$_3$ | 65 ppm by mass |
| HF | not detected by NMR and thus <20 ppm by mass. |

Sulphur-containing compound, expressed as elemental sulphur (S): 180 ppm by mass. Starting from the hypothesis that the sulphur-containing compound is residual SO$_2$, the content expressed as SO$_2$ is 360 ppm by mass.

Insoluble residue: not detected since it is less than 100 ppm by mass.

What is claimed is:

1. A process for manufacturing LiPF$_6$ by reacting LiF with PF$_5$ in a liquid, characterized in that said liquid consists essentially of sulphur dioxide (SO$_2$).

2. A process according to claim 1, characterized in that the SO$_2$ containing the LiF and PF$_5$ is at a temperature below 40° C.

3. A process according to claim 2, characterized in that the temperature ranges from −10° C. to +10° C.

4. A process according to claim 1, characterized in that the PF$_5$/LiF molar ratio is greater than or equal to 1.05.

5. A process according to claim 1, characterized in that the PF$_5$ which reacts with LiF in the liquid SO$_2$ is derived from a gaseous mixture containing hydrogen chloride (HCl).

6. A process according to claim 5, characterized in that, in this gaseous mixture, the HCl/PF$_5$ molar ratio is substantially equal to 5.

7. A process according to claim 2 characterized in that the PF$_5$/LiF molar ratio is greater than or equal to 1.05.

* * * * *